(12) United States Patent
Kitaura

(10) Patent No.: US 8,815,364 B2
(45) Date of Patent: Aug. 26, 2014

(54) OPTICAL INFORMATION RECORDING MEDIUM AND METHOD FOR MANUFACTURING SAME

(75) Inventor: Hideki Kitaura, Okayama (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 14/131,892

(22) PCT Filed: Aug. 10, 2012

(86) PCT No.: PCT/JP2012/005118
§ 371 (c)(1),
(2), (4) Date: Jan. 9, 2014

(87) PCT Pub. No.: WO2013/031107
PCT Pub. Date: Mar. 7, 2013

(65) Prior Publication Data
US 2014/0127468 A1    May 8, 2014

(30) Foreign Application Priority Data
Aug. 30, 2011    (JP) ................................. 2011-187208

(51) Int. Cl.
*G11B 7/24* (2013.01)

(52) U.S. Cl.
USPC .... 428/64.1; 428/64.4; 428/64.5; 430/270.13

(58) Field of Classification Search
USPC ..................................... 428/64.5; 430/270.13
See application file for complete search history.

(56) References Cited

U.S. PATENT DOCUMENTS

| | | | |
|---|---|---|---|
| 5,278,011 A | 1/1994 | Yamada et al. | |
| 6,268,107 B1 | 7/2001 | Yamada et al. | |
| 7,214,416 B2 | 5/2007 | Nakai et al. | |
| 7,431,973 B2 | 10/2008 | Kitaura et al. | |
| 7,767,285 B2 | 8/2010 | Nakai et al. | |
| 7,829,169 B2 | 11/2010 | Kojima et al. | |

(Continued)

FOREIGN PATENT DOCUMENTS

| | | |
|---|---|---|
| CN | 1677526 A | 10/2005 |
| CN | 101194310 A | 6/2008 |

(Continued)

OTHER PUBLICATIONS

International Search Report issued in Internation Application No. PCT/JP2012/005118 with Date of mailing Sep. 11, 2012, with English Translation.

(Continued)

*Primary Examiner* — Elizabeth Mulvaney
(74) *Attorney, Agent, or Firm* — McDermott Will & Emery LLP

(57) ABSTRACT

An optical information recording medium includes a recording film, which contains germanium, bismuth, and at least 50 at % tellurium, and has a first recording film component formed in the planar direction and having a bismuth content of at least 15 at %, a second recording film component formed in the planar direction on the side to be irradiated with a light beam and having a bismuth content that is at least 10 at % lower than that of the first recording film component, and an intermediate recording film component provided between the first and second recording film component to moderate the change in the bismuth content in the film thickness direction between the first and second recording film component, and having a bismuth content greater than the bismuth content of the second recording film component and less than the bismuth content of the first recording film component.

8 Claims, 7 Drawing Sheets

(56) References Cited

U.S. PATENT DOCUMENTS

| | | |
|---|---|---|
| RE42,222 E | 3/2011 | Yamada et al. |
| 8,133,567 B2 | 3/2012 | Kojima et al. |
| 2001/0019810 A1 | 9/2001 | Yamada et al. |
| 2005/0112499 A1 | 5/2005 | Nakai et al. |
| 2005/0202203 A1 | 9/2005 | Kitaura et al. |
| 2006/0275577 A1 | 12/2006 | Nakai et al. |
| 2007/0148396 A1 | 6/2007 | Nakai et al. |
| 2009/0130365 A1 | 5/2009 | Kojima et al. |
| 2011/0020582 A1 | 1/2011 | Kojima et al. |

FOREIGN PATENT DOCUMENTS

| | | |
|---|---|---|
| JP | H08-045074 A | 2/1996 |
| JP | 2001-209970 A | 8/2001 |
| JP | 2005-135490 A | 5/2005 |
| JP | 2005-289044 A | 10/2005 |

OTHER PUBLICATIONS

Chinese Office Action issued in Chinese Application No. 201280034328.4 dated Jun. 5, 2014, with English translation.

OPTICAL INFORMATION RECORDING MEDIUM AND METHOD FOR MANUFACTURING SAME

RELATED APPLICATIONS

This application is the U.S. National Phase under 35 U.S.C. §371 of International Application No. PCT/JP2012/005118, filed on Aug. 10, 2012, which in turn claims the benefit of Japanese Application No. 2011-187208, filed on Aug. 30, 2011, the disclosures of which Applications are incorporated by reference herein.

TECHNICAL FIELD

The present invention relates to an optical information recording medium with which an information signal can be recorded and reproduced by irradiation with a light beam, and to a method for manufacturing this medium.

BACKGROUND ART

It is possible to perform local heating by directing laser light at a thin film made of a chalcogen material or the like formed on a substrate, and use differences in irradiation conditions to effect a phase change between an amorphous phase and a crystal phase with different optical constants (refractive index n, extinction coefficient k). This is already well known, and rewritable digital versatile discs (DVD), Blu-ray Discs (BD), and the like have become very popular as optical information recording media of the so-called phase change type that makes use of this phenomenon.

With an optical information recording medium having a phase-change recording layer, it is possible to delete an existing signal and at the same time record a new signal by irradiating the recording layer while modulating the laser output according to the information signal between two or more power levels. In general, a phase-change recording layer is in an amorphous state at the point when it is formed by sputtering or another such means, and is crystallized (this is considered the initial state) by performing laser annealing or another type of initialization. This recording layer is irradiated with a high-power laser to heat it above its melting point, and then quenched to produce an amorphous phase (the recording state), and is irradiated with a low-power laser to raise it above its crystallization point, and then slowly cooled to produce a crystal phase.

The above-mentioned initialization requires a dedicated and expensive apparatus having a dedicated optical pickup, a focus server, and the like, and from the standpoint of mass production, it is preferable to omit this process. Also, the recording layer crystallizes and contracts after initialization, which tends to hamper stable production, particularly when the substrate is thin. To deal with this situation, Patent Literature 1 discloses that a crystallization promotion layer is provided as a substrate to the recording layer, which puts the recording layer in a crystal phase state after its film formation, and eliminates the need for initialization.

CITATION LIST

Patent Literature

Patent Literature 1: JP2001-209970

SUMMARY

Technical Problem

However, the crystallization promotion layer and the recording layer in Patent Literature 1 are adjacent to each other, which is as if two recording layers were integrated, and recording and erasure are performed with the layers integrated during laser light irradiation. Therefore, it is sometimes difficult to achieve both good characteristics when recording and erasure are performed at the desired linear speed, and the formation of a recording layer in a crystalline state during film formation. For example, when a crystallization promotion layer is added, the crystallization rate (integrated with the recording layer) is too high, and while a recording will be easy to delete, it is more difficult to perform recording. Specifically, satisfactory characteristics are not obtained in recording and erasure at the desired linear speed. If the recording layer is made from a composition that gives a lower crystallization rate in order to make up for this, then conversely the layer will not be formed in a crystalline state during film formation, and initialization will be necessary. There is thus a tradeoff between the characteristics when recording and erasure are performed at the desired linear speed and the formation of a recording layer in a crystalline state during film formation.

This disclosure solves the above problem, and provides an optical information recording medium that does not need to be initialized and has good signal quality in high-density recording, as well as a method for manufacturing this medium.

Solution to Problem

To solve the stated problem, the optical information recording medium in this disclosure comprises a recording film on which information is recorded by irradiation with a light beam. This recording film contains germanium, bismuth, and at least 50 at % tellurium, and has a first recording film component formed in the planar direction and having a bismuth content of at least 15 at %, a second recording film component formed in the planar direction on the side irradiated with the light beam, and having a bismuth content that is at least 10 at % lower than that of the first recording film component, and one or more intermediate recording film components provided between the first recording film component and the second recording film component in order to moderate the change in the bismuth content in the film thickness direction between the first recording film component and the second recording film component, and having a bismuth content that is greater than the bismuth content of the second recording film component and is less than the bismuth content of the first recording film component.

This allows an optical information recording medium to be provided which does not need to be initialized and has good signal quality.

With the above-mentioned optical information recording medium, it is preferable if the bismuth content of the recording film changes in stages in the film thickness direction.

This allows an optical information recording medium to be provided which does not need to be initialized and has good signal quality.

With the above-mentioned optical information recording medium, it is preferable if the intermediate recording film component has a bismuth content that continuously decreases from the first recording film component side toward the second recording film component side.

This allows an optical information recording medium to be provided which does not need to be initialized and has good signal quality.

With the above-mentioned optical information recording medium, it is preferable if said medium comprises a substrate, a reflective film disposed between the substrate and the recording film, a buffering film disposed between the reflective film and the recording film, and a protective film disposed on the opposite side from the side of the buffering film where the substrate is disposed, wherein the side of the reflective film irradiated with the light beam is the buffering film side.

This allows an optical information recording medium to be provided which does not need to be initialized and has good signal quality.

With the above-mentioned optical information recording medium, it is preferable if the substrate has a groove with a pitch of 0.5 µm or less, provided on its surface as a tracking guide for the light beam that is used to record and reproduce information.

This allows the recording density to be raised.

To solve the above-mentioned problem, the method for manufacturing an optical information recording medium in this disclosure is a method for manufacturing the above-mentioned optical information recording medium, comprising a recording film production step of producing a recording film by sputtering recording film targets having three or more different types of composition, in which the maximum and minimum bismuth contents differ by at least 10 at %, with one or more cathodes each, wherein, in the recording film production step, the object on whose surface the recording film will be produced is fixed opposite and over each recording film target, and successive laminations are performed.

This allows an optical information recording medium to be provided which does not need to be initialized and has good signal quality.

To solve the above-mentioned problem, the method for manufacturing an optical information recording medium in this disclosure is a method for manufacturing the above-mentioned optical information recording medium, comprising a recording film production step of producing the recording film by sputtering recording film targets having two or more different types of composition, in which the bismuth contents differ by at least 10 at %, with one or more cathodes each, wherein, in the recording film production step, the object on whose surface the recording film will be produced is successively passed over the targets having two or more different compositions so as to vary the composition in the film thickness direction.

This allows an optical information recording medium to be provided which does not need to be initialized and has good signal quality.

To solve the above-mentioned problem, the method for manufacturing an optical information recording medium in this disclosure is a method for manufacturing the above-mentioned optical information recording medium, comprising a recording film production step of producing the recording film by sputtering one joined target obtained by joining recording film targets having two or more different types of composition, in which the bismuth contents differ by at least 10 at %, with one cathode, wherein, in the recording film production step, the object on whose surface the recording film will be produced is successively passed over the targets having two or more different compositions so as to vary the composition in the film thickness direction.

This allows an optical information recording medium to be provided which does not need to be initialized and has good signal quality.

Advantageous Effects

This disclosure provides an optical information recording medium to be provided which does not need to be initialized and has good signal quality, as well as a method for manufacturing this medium.

DESCRIPTION OF EMBODIMENTS

An embodiment will now be described through reference to the drawings as needed. Unnecessarily detailed description may be omitted in some cases, however. For example, a detailed description of things that are already well known, and redundant description of components with substantially the same configuration may be omitted. This is to keep the following description from being unnecessarily repetitive, and to facilitate an understanding on the part of a person skilled in the art.

The inventors have provided the appended drawings and the following description so that a person skilled in the art will fully understand this disclosure, but these are not intended to limit what is defined in the patent claims.

Embodiment 1

Embodiment 1 will be described through reference to FIGS. 1 to 4.
1-1. Configuration FIG. 1 is a partial cross section of a configuration example of the optical information recording medium disclosed herein.

Figure 1:
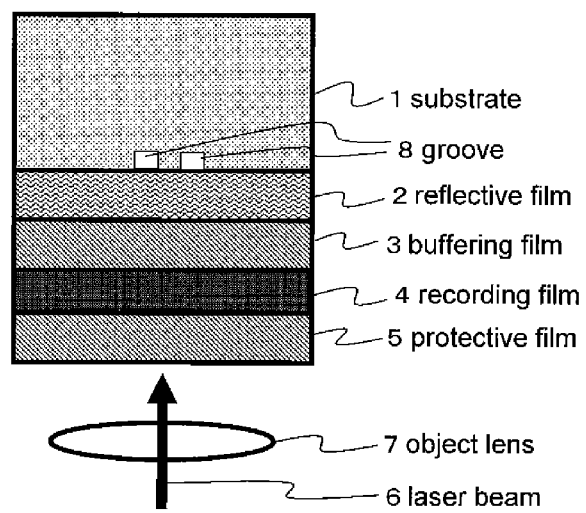
FIG. 1 is a cross section of a configuration example of the optical information recording medium pertaining to Embodiment 1.

As shown in FIG. 1, the optical information recording medium in this embodiment comprises at least a reflective film 2, a buffering film 3, a recording film 4, and a protective film 5, provided in that order over a substrate 1. A cover layer composed of an inorganic material thin-film, a resin, or the like can also be provided as needed over this. A laser beam 6 is converged with an object lens 7 on the optical information recording medium from the protective film 5 side, and recording and reproduction are performed by irradiation. Also, a groove 8 used for tracking guidance is formed in the surface of the substrate 1. FIG. 1 is a simplified diagram, and the scale of the film thickness and so forth may be altered for the sake of simplicity. Also, only part of the groove 8 is depicted, in order to show where it is formed.

1-1-1. Configuration of Substrate

The base material of the substrate 1 can be a polycarbonate resin, a polymethyl methacrylate resin, a polyolefin resin, a norbornene resin, a polyethylene terephthalate, polyethylene naphthalate, or other polyester resin, a polyamide resin, a polyimide resin, a UV-curing resin, glass, a suitable combination of these, or the like. There are no particular restrictions on the thickness of the substrate 1, but it can be about 0.003 to 3.0 mm, and various shapes can be used, such as a disk shape, a rectangular shape, or a tape shape.

The pitch of the groove 8 formed in the surface of the substrate 1 and used for the tracking of the laser beam 6 is preferably no more than 0.5 μm, in order to increase the recording density.

This groove 8 may be formed by directly pressing a master die, which is composed of a metal material, a resin material, or the like and has a groove pattern, into the above-mentioned base material, or may be formed by pressing the master die after coating with a UV-curing resin, and then curing the resin by irradiating it with UV light.

1-1-2. Configuration of Reflective Film

Silver, gold, aluminum, copper, or another such metal, or alloys based on these, can be used as the material of the reflective film 2, but it is particularly favorable to use silver, aluminum, or alloys based on these, because they have high reflectivity in the blue light wavelength band. This affords better signal quality in high-density recording using a violet laser as the laser beam 6. There are no particular restrictions on the elements added to the silver or aluminum, but palladium, platinum, nickel, ruthenium, gold, copper, zinc, gallium, indium, silicon, germanium, tin, antimony, bismuth, calcium, magnesium, yttrium, neodymium, samarium, titanium, chromium, oxygen, nitrogen, fluorine, carbon, sulfur, boron, and the like are suitable because they have the effect of reducing the particle size and preventing agglomeration when added in a small amount. Of these, palladium, copper, bismuth, neodymium, yttrium, gallium, chromium, and nickel provided a better effect. One or more of these elements can be used. In order for this effect to be achieved while not sacrificing the high reflectivity and thermal conductivity of silver and aluminum, the added elements are preferably added in a proportion of at least 0.01 at % and no more than 10 at % with respect to the entire reflective film 2, and more preferably in a proportion of at least 0.05 at % and no more than 5 at %.

1-1-3. Configuration of Buffering Film and Protective Film

The material of the buffering film 3 and the protective film 5 preferably satisfies all of the following conditions: (1) it has high heat resistance and protects the recording film 4 from thermal damage, (2) it has good adhesion to the adjacent materials, such as those of the recording film 4 or the reflective film 2, and no peeling, corrosion, diffusion, or the like occurs under conditions of high temperature and humidity, (3) it has good transparency and a suitable refractive index, and enhances the optical change in the recording film 4, and (4) it is thermally stable itself, and its particle size and composition distribution do not fluctuate under high temperature and humidity. Examples of materials that can be used include Si—N, Si—O, Si—C, Ge—N, Ti—N, Ti—O, Zr—O, Hf—O, Nb—O, Ta—O, Cr—N, Cr—O, Mo—N, Mo—O, Ga—N, Ga—O, Y—O, Al—O, carbon, and mixtures of these. Of these, a material in which Ge—N, Si—N, Si—Ge—N, or Zr—O is the base, to which Ti—N, Al—O, Cr—N, Cr—O, Y—O, or the like has been added is superior in terms of moisture resistance. The thickness of the buffering film 3 and the protective film 5 is preferably at least 2 nm and no more than 50 nm, and more preferably at least 5 nm and no more than 30 nm, for example. The material of the buffering film 3 and the protective film 5 can be a material or composition that is the same as or different from those mentioned above, as needed.

1-1-4. Configuration of Recording Film

The material of the recording film 4 is preferably one that includes germanium, bismuth, and at least 50 at % tellurium, in which the bismuth content is at least 15 at % on the buffering film 3 side and at least 5 at % lower on the protective film 5 side than on the buffering film 3 side, and whose composition either changes in three more stages in the film thickness direction, or changes continuously in at least a part thereof. With the phase-change recording material Ge—Bi—Te, the crystallization rate is highest with a composition in which the two compounds GeTe and $Sb_2Te_3$ are mixed. The more the material deviates from this composition, the lower is the crystallization rate, which is not suited to practical recording and reproduction, so the tellurium proportion is set to at least 50% and no more than 60%.

Figure 2A:
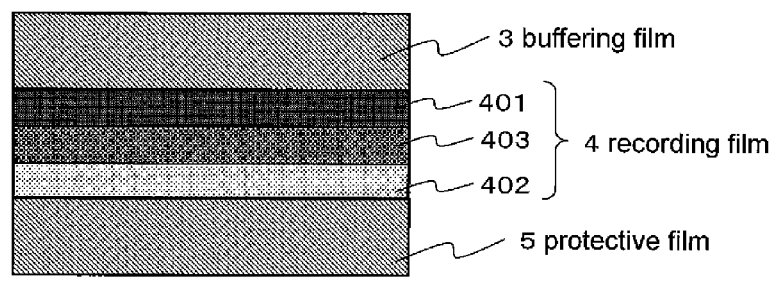
FIG. 2a is a cross section of a configuration example of the recording film in the optical information recording medium pertaining to Embodiment 1.

FIG. 2a is a partial cross section of a recording film whose composition changes in three stages in the film thickness direction. The recording film 4 shown in FIG. 2a has a first recording film component 401, an intermediate recording film component 403, and a second recording film component 402, which are formed as layers in the planar direction. The first recording film component 401, intermediate recording film component 403, and second recording film component 402 are formed in that order in the film thickness direction starting from the buffering film 3 side. The composition is substantially uniform in each of these film components. The bismuth content of the first recording film component 401 on the buffering film 3 side is at least 15 at %, and the bismuth content of the second recording film component 402 on the protective film 5 side is at least 5 at % lower than that of the first recording film component 401. The bismuth content of the intermediate recording film component 403 disposed between the first recording film component 401 and the second recording film component 402 is greater than the bismuth content of the second recording film component 402 and less than the bismuth content of the first recording film component 401.

Thus, the composition of the recording film 4 shown in FIG. 2a changes in three stages in the film thickness direction.

Figure 2B:
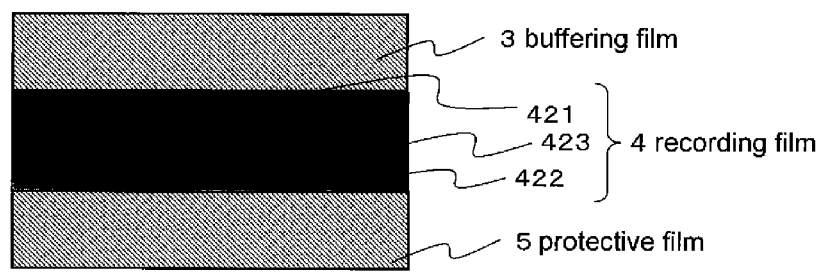
FIG. 2b is a cross section of a configuration example of the recording film in the optical information recording medium pertaining to Embodiment 1.

FIG. 2b is a partial cross section of a recording film whose composition changes continuously in the film thickness direction. The composition of the recording film 4 shown in FIG. 2b changes continuously in the film thickness direction from the buffering film 3 side to the protective film 5 side. For example, the bismuth content continuously decreases in the film thickness direction from the buffering film 3 side to the protective film 5 side. The bismuth content of a first recording film component 421, which is the portion adjacent to the buffering film 3, is at least 15 at %, and the bismuth content of a second recording film component 422, which is the portion adjacent to the protective film 5, is at least 5 at % less than that of the first recording film component 421 adjacent to the buffering film 3. The portion of the recording film 4 excluding the first recording film component 421 and the second recording film component 422 is shown as a intermediate recording film component 423.

Figure 2C:
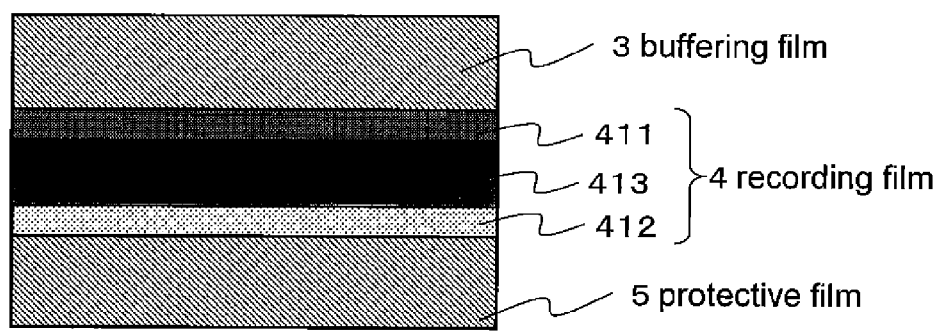
FIG. 2c is a cross section of a configuration example of the recording film in the optical information recording medium pertaining to Embodiment 1.

FIG. 2c is a partial cross section of a recording film in which part of the composition changes continuously in the film thickness direction. The recording film 4 shown in FIG. 2c has a first recording film component 411, an intermediate recording film component 413, and a second recording film component 412, which are formed as layers in the planar direction. The first recording film component 411, intermediate recording film component 413, and second recording film component 412 are formed in that order in the film thickness direction starting from the buffering film 3 side. The bismuth content of the first recording film component 411 on the buffering film 3 side is at least 15 at %, and the bismuth content of the second recording film component 412 on the protective film 5 side is at least 5 at % lower than that of the first recording film component 411. The composition of the intermediate recording film component 413 changes continuously in the film thickness direction from the composition of the first recording film component 411 to the composition of the second recording film component 412. Also, the bismuth content of the intermediate recording film component 413 is greater than the bismuth content of the second recording film component 412 and less than the bismuth content of the first recording film component 411. Thus, there may be a portion of uniform composition in the film thickness direction of the recording film 4. The configuration shown in FIG. 2c corresponds to the configuration shown in FIG. 2b in which the thickness of the first recording film component 411 and the second recording film component 412 has been reduced.

Thus, sudden compositional changes in the film thickness direction are moderated, which allows the state of the entire recording film 4 to be put in a crystal phase after film formation and also affords a composition having a crystallization rate that is suited to the desired linear recording speed, as the average composition. Other components besides germanium, bismuth, and tellurium may also be contained as needed. Specifically, one or more elements selected from among antimony, tin, indium, gallium, zinc, copper, silver, gold, chromium, and other such metal, semi-metal, and semiconductor elements, or oxygen, nitrogen, fluorine, carbon, sulfur, boron, and other such non-metal elements can be contained as needed in a proportion of no more than 10 at %, and preferably no more than 5 at %, for the purpose of adjusting the crystallization rate, thermal conductivity, optical constant, etc., improving repetition durability or environmental reliability, and so forth.

The thickness of the recording film 4 is preferably at least 4 nm and no more than 20 nm, and more preferably at least 6 nm and no more than 16 nm. If the recording film 4 is thinner than this, adequate reflectivity and change in reflectivity may not be obtained, crystallization will be more difficult, etc., so the C/N ratio and/or the erasure may be lower. If the film is thicker than this, however, there will be relatively more heat diffusion within the thin-film plane of the recording film 4, so the recording marks will have an indistinct outline, and the C/N ratio will end up being lower.

The various thin-films mentioned above can be formed, for example, by vacuum vapor deposition, sputtering, ion plating, CVD (chemical vapor deposition), MBE (molecular beam epitaxy), or another such vapor phase thin-film deposition method. The materials and compositions of the various thin-films can be adjusted by Auger electron spectroscopy, X-ray electron spectroscopy, secondary ion mass spectrometry, or another such method (see, for example, "Thin-Film Production Handbook," Applied Physics Society, Thin-Film/Surface Physics Society edition, published by Kyoritsu Shuppan, 1991).

1-2. Conventional Manufacturing Method

Figure 6:
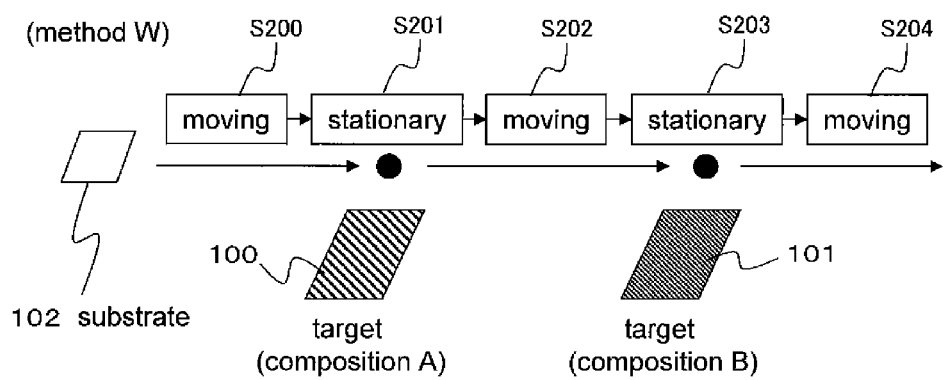
FIG. 6 is a simplified diagram of a conventional method for manufacturing an optical information recording medium.

First, a conventional method for manufacturing an optical information recording medium will be described through reference to FIG. 6. FIG. 6 is a simplified diagram of a conventional method for manufacturing an optical information recording medium. As shown in FIG. 6, a method W was used in the past in the formation of the recording film, and targets of composition A and B were used to produce two layers of different compositions on a substrate.

To describe this in more detail, in the method W, a target 100 of composition A and a target 101 of composition B (two sputtering targets) are disposed spaced apart. A substrate 102 is moved to a position opposite the target 100 of composition A (S200), and stopped at that position (S201), where a recording film of composition A is formed. Then, the substrate 102 is moved to a position opposite the target 101 of composition B (S202), and stopped at that position (S203), where a recording film of composition B is formed. The substrate is then moved from that position so that the next film formation can be performed (S204). This sputtering forms a recording film made up of two layers of different compositions.

1-3. Manufacturing Method Disclosed Herein

Next, the method for manufacturing an optical information recording medium disclosed herein will be described.

Figure 3:
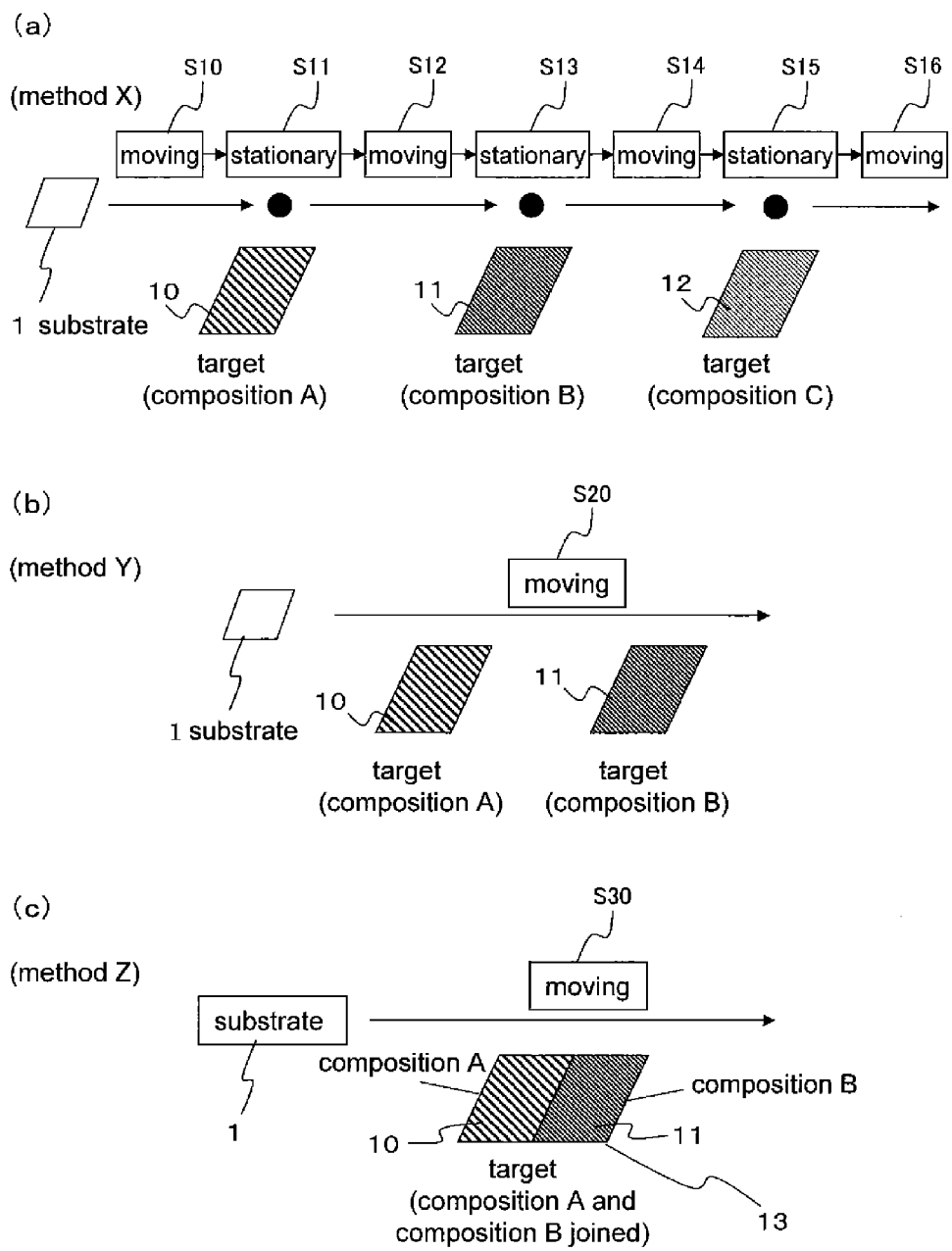
FIG. 3a is a simplified diagram of a method X for manufacturing the optical information recording medium pertaining to Embodiment 1.
FIG. 3b is a simplified diagram of a method Y for manufacturing the optical information recording medium pertaining to Embodiment 1.
FIG. 3c is a simplified diagram of a method Z for manufacturing the optical information recording medium pertaining to Embodiment 1.

FIG. 3 is a simplified diagram of the method for manufacturing an optical information recording medium in this embodiment.

Figure 4A:
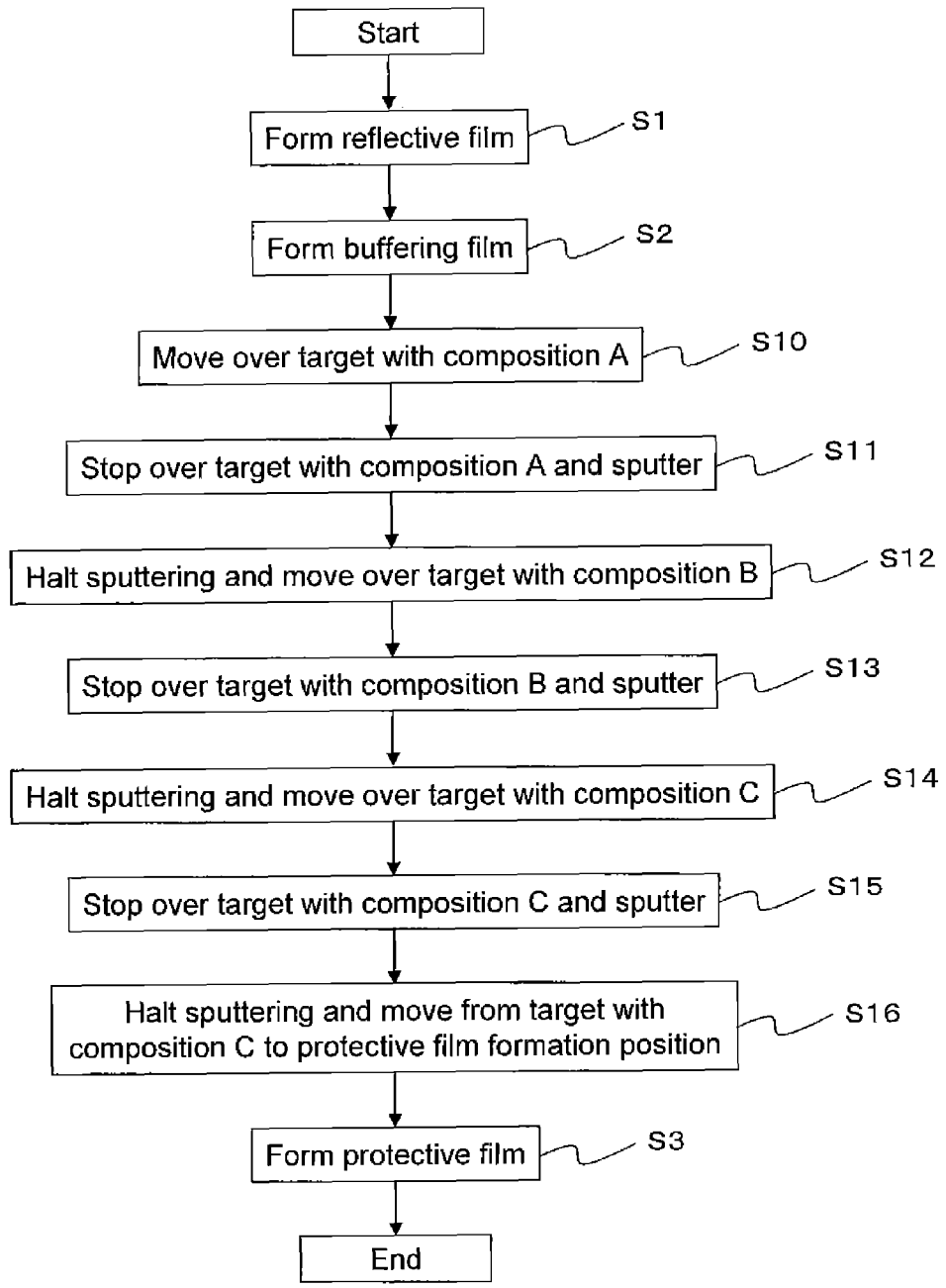
FIG. 4a is a flowchart of when using the method X for manufacturing the optical information recording medium pertaining to Embodiment 1.

In contrast to the conventional method W discussed above, a recording film is formed using the method X shown in FIG. 3a, the method Y shown in FIG. 3b, and the method Z shown in FIG. 3c. FIG. 4 consists of flowcharts of the method for manufacturing an optical information recording medium in this embodiment. FIG. 4a shows the flow in the method X, FIG. 4b shows the flow in the method Y, and FIG. 4c shows the flow in the method Z.

These methods X, Y, and Z corresponding to examples of the recording film production steps.

Figure 4B:
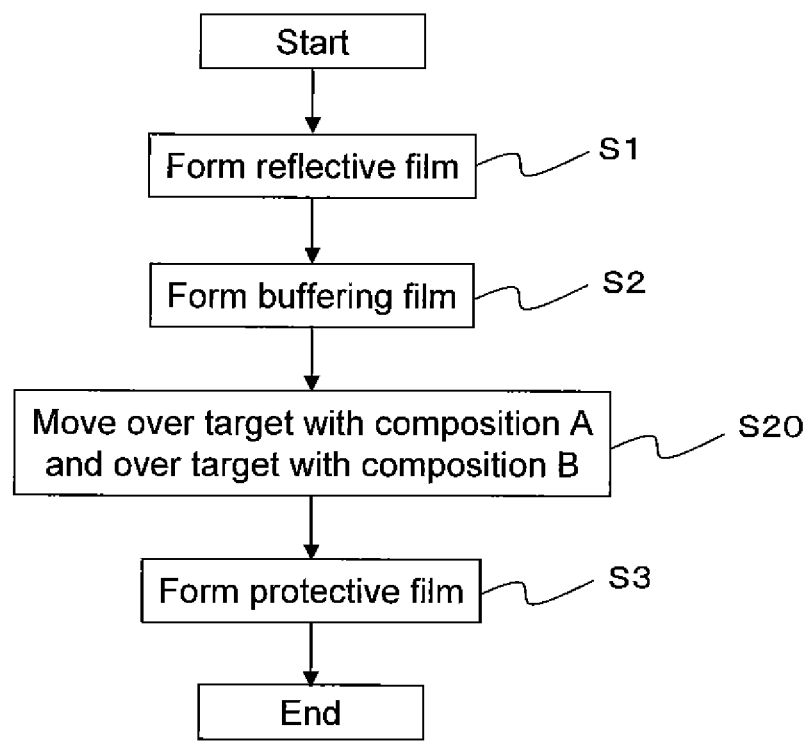
FIG. 4b is a flowchart of when using the method Y for manufacturing the optical information recording medium pertaining to Embodiment 1.
Figure 4C:
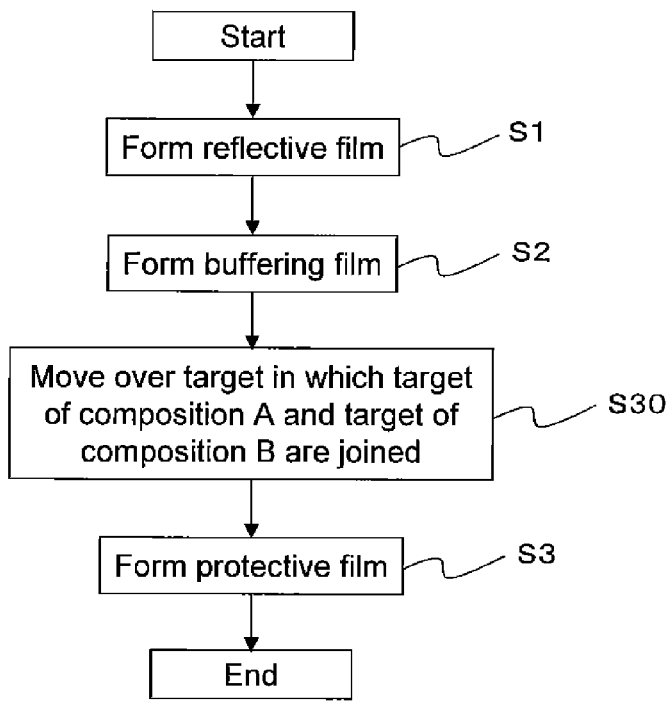
FIG. 4c is a flowchart of when using the method Z for manufacturing the optical information recording medium pertaining to Embodiment 1.

First, as shown in FIGS. 4a to 4c, the reflective film 2 is formed on the substrate 1 by a known thin-film formation method such as sputtering (S1). The buffering film 3 is then formed on the reflective film 2 by a known thin-film formation method such as sputtering (S2). The recording film 4 is then formed using methods X, Y, and Z, which are described in order below. The protective film 5 is formed on the recording film 4 by a known thin-film formation method such as sputtering (S5). This produces the optical information recording medium of this embodiment.

Methods X, Y, and Z will be described in detail and in order through reference to FIGS. 3 and 4.

1-3-1. Method X

As shown in FIGS. 3a and 4a, with the method X, a target of composition C is further added to the method W, so that three layers of different compositions are produced.

More precisely, with the method X, a target 10 of composition A, a target 11 of composition B, and a target 12 of composition C, which are sputtering targets with three different compositions, are disposed spaced apart. The substrate 1 on which the reflective film 2 and the buffering film 3 have been formed by sputtering or the like is then moved to a position opposite the target 10 of composition A (S10), and stopped at this position (S11) for sputtering. This forms a film of composition A (corresponds to the first recording film component 401) on the buffering film 3. Next, the sputtering is halted and the substrate 1 is moved from a position opposite the target 10 of composition A to a position opposite the target 11 of composition B (S12). The substrate is stopped at this position (S13) and sputtering is performed, which forms a film of composition B (corresponds to the second recording film component 403) on the buffering film 3. The sputtering is then halted, and the substrate 1 is moved from a position opposite the target 11 of composition B to a position opposite the target 12 of composition C (S14). The substrate is stopped at this position (S15), and sputtering is performed, which forms a film of composition C (corresponds to the intermediate recording film component 402) on the buffering film 3, and the substrate 1 is moved away from the position opposite the target 12 of composition C (S16).

Thus, the recording film 4 with the configuration shown in FIG. 2a is produced with the method X.

1-3-2. Method Y

As shown in FIGS. 3b and 4b, with the method Y, targets of compositions A and B are used, and a recording film at least part of whose composition changes continuously in the film thickness direction is produced on the substrate by passage over these targets.

More precisely, with the method Y, the target 10 of composition A and the target 11 of composition B, which are sputtering targets with two different compositions, are disposed spaced apart. In step S20, the substrate 1 on which the reflective film 2 and the buffering film 3 were formed by sputtering or the like is passed through a position opposite the target 10 of composition A, and then passed through a position opposite the target 11 of composition B, which forms a recording film in which at least part of the composition changes continuously in the film thickness direction.

1-3-3. Method Z

As shown in FIGS. 3c and 4c, with the method Z a single target in which compositions A and B are joined is used, and a recording film in which at least part of the composition changes continuously in the film thickness direction is produced on the substrate by passage over this target.

More precisely, with the method Z, a target 12 is used in which the target 10 of composition A and the target 11 of composition B are joined. In step S30, the substrate 1 is moved over the target 12 in the layout direction of the target 10 of composition A and the target 11 of composition B, which forms a recording film in which at least part of the composition changes continuously in the film thickness direction.

The recording films formed with the methods Y and Z have the configuration shown in FIG. 2b or the configuration shown in FIG. 2c, for example, depending on the movement speed of the substrate 1, the size and layout of the target 10 of composition A and the target 11 of composition B, and so on.

With these methods X, Y, and Z, compositional changes in the film thickness direction are less sudden than with the conventional method W, which allows the entire recording film to be put in a crystal phase after film formation, and also affords a composition having a crystallization rate that is suited to the desired linear recording speed, as the average composition.

WORKING EXAMPLES

This disclosure will now be described in specific terms by giving working examples, but is not limited to or by these examples.

Working Example 1

The substrate was composed of a polycarbonate resin, and was in the form of a disk with a diameter of approximately 12 cm and a thickness of approximately 1.1 mm, in which a spiral groove was formed ahead of time at a groove pitch of 0.32 μm and a groove depth of approximately 30 nm. Over the surface of this substrate in which the groove was formed were produced in the following order, by sputtering, a reflective film with a thickness of approximately 60 nm (using an aluminum target), a buffering film with a thickness of approximately 15 nm (using an $Si_3N_4$ target), a recording film with a thickness of approximately 12 nm (using a plurality of Ge—Bi—Te targets), and a protective film with a thickness of approximately 20 nm (using an $Si_3N_4$ target).

These thin-films were all formed using targets with a length of 100 mm in the conveyance direction of the substrate, a width of 200 mm in the direction perpendicular to this, and a thickness of about 10 mm. The films were all formed using a DC power supply, with the sputtering power adjusted between 1 and 4 kW for the reflective film, the buffering film, and the protective film, and between 100 and 600 W for the recording film, so as to obtain the desired film thickness and recording film compositional ratio. For the sputtering gas, argon gas was introduced for all the films, the partial pressure of which was suitably maintained at 0.2 Pa, and with the buffering film and the protective film, $N_2$ was further introduced to effect suitably nitriding, the partial pressure of which was adjusted to about 0.1 Pa. The conveyance speed of the substrate was adjusted so as to obtain the above-mentioned desired film thickness within a range of 3 to 6 meters/minute. The stationary time above the target, the movement speed between targets, and so forth were set so that the individual thicknesses of the first recording film component 401, the intermediate recording film component 403, and the second recording film component 402 produced when using the method X would be equivalent (approximately 4 nm).

Recording films were formed by various methods and in various compositions as shown in Table 1, which produced disks of the working and comparative examples in this disclosure.

TABLE 1

| Disk No. | Method | Recording film formation method and target composition ||||||||| State of recording film after formation | C/N ratio |
|---|---|---|---|---|---|---|---|---|---|---|---|---|
| | | Comp. A (at %) ||| Comp. B (at %) ||| Comp. C (at %) ||| | |
| | | Ge | Bi | Te | Ge | Bi | Te | Ge | Bi | Te | | |
| 1 | W | 22 | 22 | 56 | 38 | 10 | 52 | — | — | — | ○ | X |
| 2 | W | 22 | 22 | 56 | 47 | 2 | 51 | — | — | — | X | ⊚ |
| 3 | X | 22 | 22 | 56 | 38 | 10 | 52 | 47 | 2 | 51 | ○ | ⊚ |
| 4 | X | 31 | 15 | 54 | 38 | 10 | 52 | 47 | 2 | 51 | Δ | ⊚ |
| 5 | X | 35 | 12 | 53 | 38 | 10 | 52 | 47 | 2 | 51 | X | ⊚ |
| 6 | X | 22 | 22 | 56 | 38 | 10 | 52 | 35 | 12 | 53 | ○ | Δ |

TABLE 1-continued

| | | | | | | | | | | | | |
|---|---|---|---|---|---|---|---|---|---|---|---|---|
| 7 | X | 22 | 22 | 56 | 27 | 18 | 55 | 31 | 15 | 54 | ○ | X |
| 8 | Y | 22 | 22 | 56 | 47 | 2 | 51 | — | — | — | ○ | ◉ |
| 9 | Y | 31 | 15 | 54 | 47 | 2 | 51 | — | — | — | Δ | ◉ |
| 10 | Y | 35 | 12 | 53 | 47 | 2 | 51 | — | — | — | X | ◉ |
| 11 | Y | 22 | 22 | 56 | 35 | 12 | 53 | — | — | — | ○ | Δ |
| 12 | Y | 22 | 22 | 56 | 31 | 15 | 54 | — | — | — | ○ | X |
| 13 | Z | 22 | 22 | 56 | 47 | 2 | 51 | — | — | — | ○ | ◉ |
| 14 | Z | 31 | 15 | 54 | 47 | 2 | 51 | — | — | — | Δ | ◉ |
| 15 | Z | 35 | 12 | 53 | 47 | 2 | 51 | — | — | — | X | ◉ |
| 16 | Z | 22 | 22 | 56 | 35 | 12 | 53 | — | — | — | ○ | Δ |
| 17 | Z | 22 | 22 | 56 | 31 | 15 | 54 | — | — | — | ○ | X |

Key to symbols

| Symbol | State of recording film after formation | C/N ratio |
|---|---|---|
| ◉ | — | at least 45 dB |
| ○ | crystalline | at least 42 dB and less than 45 dB |
| Δ | between crystalline and amorphous | at least 40 dB and less than 42 dB |
| X | amorphous | less than 40 dB |

Table 1 shows the state of each disk after the recording film was formed. Here, when initialization was performed using a laser initialization device, the product was deemed to be crystalline if the reflectivity change was less than 2%, in between crystalline and amorphous if at least 2% and less than 10%, and amorphous if at least 10%, that is, deemed to be a level at which there would actually be problems in recording and erasure of the signal unless initialization were performed.

Using an optical system with a wavelength of 405 nm and a lens numerical aperture of 0.85, the disk was rotated at a linear speed of 9.8 m/s while directing laser light at the portion of the spiral groove that was convex as seen from the laser light incident side, a single signal with a frequency of 33 MHz was recorded, and the C/N ratio thereof was measured with a spectrum analyzer. The results are given in Table 1.

As shown in Table 1, with disk No. 1 (comparative example), the recording film was crystalline in its state after film formation, but the average bismuth content for the recording film as a whole was high (approximately 16 at %), and the crystallization rate was too high, so the C/N ratio was unsatisfactory.

On the other hand, with disk No. 2 (comparative example), the bismuth content in composition B was 20% lower than in composition A, and since this difference is too abrupt, the state after film formation is not crystalline, but amorphous.

In contrast, with disk No. 3 (working example), the differences in the bismuth content between compositions A and B and compositions B and C of the recording film were smaller than with disk No. 2 and the change was more gradual, the state after film formation was crystalline, and the bismuth content and crystallization rate for the recording film as a whole were suitable, so a sufficiently high C/N ratio was obtained.

With disk No. 4 (working example), the bismuth content of composition A was lower than with disk No. 3, so the state of the recording film after film formation was not completely crystalline, but was still within an acceptable range.

With disk No. 5 (comparative example), the bismuth content of composition A was even lower that with disk No. 4, so the state after film formation was not crystalline, and ended up being amorphous.

With disk No. 6 (working example), the bismuth content of composition C was greater than with disk No. 3, and the C/N ratio decreased, but was within an acceptable range.

With disk No. 7 (comparative example), the bismuth content of composition C even greater than with disk No. 6, so the crystallization rate was too high, and the C/N ratio ended up being unsatisfactory.

With disk No. 8 (working example), the composition of the recording film changed continuously from composition A to composition B in the film thickness direction, so just as with disk No. 3, the state of the recording film after film formation was crystalline, and furthermore a sufficiently high C/N ratio was obtained.

With disk No. 9 (working example), the bismuth content of composition A was less than with disk No. 8, so the state of the recording film after film formation was not completely crystalline, but was within an acceptable range.

With disk No. 10 (comparative example), the bismuth content of composition A was even less than with disk No. 9, so the state after film formation was not crystalline, and ended up being amorphous.

With disk No. 11 (working example), the bismuth content of composition B was greater than with disk No. 8, and the C/N ratio decreased, but was within an acceptable range.

With disk No. 12 (comparative example), the bismuth content of composition B was even greater than with disk No. 11, so the crystallization rate was too high, and the C/N ratio ended up being unsatisfactory.

With disk No. 13 (working example), the composition of the recording film changed continuously from composition A to composition B in the film thickness direction, so just as with disk No. 3, the state of the recording film after film formation was crystalline, and furthermore a sufficiently high C/N ratio was obtained.

With disk No. 14 (working example), the bismuth content of composition A was less than with disk No. 13, so the state of the recording film after film formation was not completely crystalline, but was within an acceptable range.

With disk No. 15 (comparative example), the bismuth content of composition A was even less than with disk No. 14, so the state after film formation was not crystalline, and ended up being amorphous.

With disk No. 16 (working example), the bismuth content of composition B was greater than with disk No. 13, and the C/N ratio decreased, but was within an acceptable range.

With disk No. 17 (comparative example), the bismuth content of composition B was even greater than with disk No. 16, so the crystallization rate was too high, and the C/N ratio ended up being unsatisfactory.

Because of the above, no matter whether the optical information recording medium is produced by the method X, Y, or Z, it can be seen that if the bismuth content of the first recording film components 401, 411, and 421 is at least 15 at %, the bismuth content of the second recording film components 402, 412, and 422 is at least 10 at % less than the bismuth content of the first recording film components 401, 411, and 421, and the intermediate recording film components 403, 413, and 423 are provided between these for moderating the change in the bismuth content, then the film will be crystallized after its formation and a good C/N ratio will be obtained.

1-4. Effect, Etc.

As discussed above, in this embodiment, the optical information recording medium comprises the recording film 4, whose composition changes in three stages. The recording film 4 has the first recording film component 401, the second recording film component 402, and the intermediate recording film component 403. The bismuth content of the first recording film component 401 is at least 15 at %, and the bismuth content of the second recording film component 402 is at least 10 at % less than that of the first recording film component 401. Also, the bismuth content of the intermediate recording film component 403 disposed between the first recording film component 401 and the second recording film component 402 is greater than the bismuth content of the second recording film component 402, and less than the bismuth content of the first recording film component 401.

Consequently, compositional changes in the film thickness direction are less sudden, so there is no need for initialization and good signal quality is obtained.

Also, in this embodiment, the optical information recording medium comprises the recording film 4, and the composition of the recording film 4 changes continuously in the film thickness direction. The recording film 4 has the first recording film component 421, the second recording film component 422, and the intermediate recording film component 423. The bismuth content of the first recording film component 421 is at least 15 at %, and the bismuth content of the second recording film component 422 is at least 10 at % less than that of the first recording film component 421. Also, the bismuth content of the intermediate recording film component 423 disposed between the first recording film component 401 and the second recording film component 422 is greater than the bismuth content of the second recording film component 422, and less than the bismuth content of the first recording film component 421.

Consequently, compositional changes in the film thickness direction are less sudden, so there is no need for initialization and good signal quality is obtained.

Also, in this embodiment, the substrate 1 has a groove with a pitch of 0.5 µm or less provided on its surface as a tracking guide for the light beam that is used to record and reproduce information.

Consequently, the recording density can be raised. Also, when the recording density has thus been raised, signal quality is particularly prone to degradation, but good signal quality can be obtained with the recording film configuration of this embodiment, described above.

Also, in this embodiment, the method for manufacturing an optical information recording medium comprises a method X (an example of a recording film production step) for producing the recording film 4 by sputtering recording film targets having three or more different types of composition, in which the maximum and minimum bismuth contents differ by at least 10 at %, with one or more cathodes each. With the method X, the substrate 1 on which the buffering film 3 and the reflective film 2 have been formed (an example of the object on whose surface the recording film will be produced) is fixed opposite and over each of the recording film targets 10, 11, and 12, and successive laminations are performed.

Consequently, a recording film whose composition changes continuously in the film thickness direction is produced, and compositional changes in the film thickness direction are less sudden, so an optical information recording medium can be produced with which there is no need for initialization, and good signal quality is obtained.

Also, in this embodiment, the method for manufacturing an optical information recording medium comprises a method Y (an example of a recording film production step) for producing the recording film by sputtering recording film targets 10 and 11 having two or more different types of composition, in which the bismuth contents differ by at least 10 at %, with one or more cathodes each. With the method Y, the substrate 1 on which the buffering film 3 and the reflective film 2 have been formed (an example of the object on whose surface the recording film will be produced) is successively passed over the targets having two or more different compositions so as to change the composition in the film thickness direction.

Consequently, a recording film is produced in which at least part of the composition changes continuously in the film thickness direction, and the compositional change in the film thickness direction is less sudden, so an optical information recording medium can be produced with which there is no need for initialization, and good signal quality is obtained.

Also, in this embodiment, the method for manufacturing an optical information recording medium comprises a method Z (an example of a recording film production step) for producing the recording film 4 by sputtering one joined target 13 obtained by joining recording film targets having two or more different types of composition, in which the bismuth contents differ by at least 10 at %, with one cathode. With the method Z, the substrate 1 on which the buffering film 3 and the reflective film 2 have been formed (an example of the object on whose surface the recording film will be produced) is successively passed over the target 13 so as to vary the composition in the film thickness direction.

Consequently, a recording film is produced in which at least part of the composition changes continuously in the film thickness direction, and the compositional change in the film thickness direction is less sudden, so an optical information recording medium can be produced with which there is no need for initialization, and good signal quality is obtained.

Other Embodiments

Embodiment 1 was described above as an example of the technology disclosed herein. However, the technology disclosed herein is not limited to this, and can also be applied to embodiments with modifications, substitutions, additions, omissions, and so forth made as needed. Also, the various constituent elements described in Embodiment 1 above can be combined to create new embodiments.

In view of this, examples of other embodiments will now be given.

In Embodiment 1, the recording film 4 in FIG. 2a was described as an example of a recording film in which the bismuth content changes in stages. With the recording film 4 shown in FIG. 2a, the bismuth content changes in three stages, but the number of stages is not limited to three, and the recording film may have four or more stages, that is, two or more intermediate recording film components. Thus there are four or more stages by providing two or more intermediate recording components, which smoothes out the changes in composition.

Figure 5:
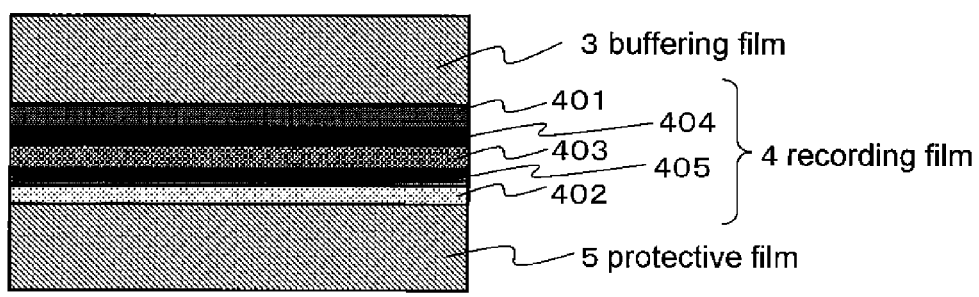
FIG. 5 is a cross section of a configuration example of the optical information recording medium pertaining to a modification example of Embodiment 1.

Also, in FIG. 2a the intermediate recording film component 403 is shown as having a substantially uniform composition, in FIG. 2b the intermediate recording film component 423 is shown as having a composition that changes continuously in the film thickness direction, and in FIG. 2c the intermediate recording film component 413 is shown as being provided to part of the recording film and having a composition that changes continuously, but these configurations are not the only option, and an intermediate recording film component with a uniform composition may be combined with an intermediate recording film component whose composition changes continuously in the film thickness direction. FIG. 5 is a partial cross section of a recording film with this configuration. With the recording film 4 shown in FIG. 5 in comparison with the configuration in FIG. 2a, but an intermediate recording film component 404 whose composition changes continuously in the film thickness direction is provided between the first recording film component 401 and the intermediate recording film component 403, and an intermediate recording film component 405 whose composition changes continuously in the film thickness direction is provided between the second recording film component 402 and the intermediate recording film component 403. The recording film shown in FIG. 5 corresponds to an example of a recording film having a plurality of intermediate recording film components, and this recording film 4 can be produced by narrowing the spacing between the targets 10, 11, and 12 in the method X shown in FIG. 3a, changing the movement speed of the substrate 1, performing sputtering during movement between the targets 10, 11, and 12, or the like. Furthermore, an intermediate recording film component with a uniform composition may be provided in the middle of the intermediate recording film component 423 shown in FIG. 2b. In other words, what is important is that the change in the bismuth content between the first recording film component and the second recording film component be moderated.

Also, in the above embodiment, the buffering film 3 was adjacent to the first recording film components 401, 411, and 412 in which the bismuth content was at least 15 at %, but a portion whose bismuth content is less than the bismuth content of the first recording film components 401, 411, and 412 may be provided between the buffering film 3 and the first recording film components 401, 411, and 412.

Also, in the above embodiment, an example of an optical information recording medium was given in which the medium comprised the substrate 1, the reflective film 2, the buffering film 3, the recording film 4, and the protective film 5, and the laser beam 6 was emitted from the protective film 5 side. The information recording medium need only comprise a recording film that contains germanium, bismuth, and at least 50 at % tellurium, and has a first recording film component formed in the planar direction and having a bismuth content of at least 15 at %, a second recording film component formed in the planar direction on the side irradiated with the light beam and having a bismuth content that is at least 10 at % lower than that of the first recording film component, and one or more intermediate recording film components provided between the first recording film component and the second recording film component in order to moderate the change in the bismuth content in the film thickness direction between the first recording film component and the second recording film component and having a bismuth content that is greater than the bismuth content of the second recording film component and is less than the bismuth content of the first recording film component. Therefore, the optical information recording medium is not limited to the configuration in FIG. 1. For instance, the configuration may be such that the substrate is transparent and the laser light is emitted from the substrate side. In this case, the reflective film is disposed on the opposite side of the recording film from the substrate.

Also, a film-form polyethylene terephthalate substrate with a thickness of 5 μm was coated with a UV resin, a linear groove was formed at a groove pitch of 0.32 μm and a groove depth of approximately 30 nm, the same reflective film, buffering film, recording film, and protective film as above were formed over this surface, and this product was cut parallel to the groove in a half-inch width to produce a tape-form recording medium. This was affixed to the side surface of a rotating drum, which was then rotated and the same measurement as above was conducted. The results were the same as those in Table 1.

Embodiments were given above as examples of the technology disclosed herein. The appended drawings and a detailed description were provided for that purpose. Therefore, the constituent elements shown in the appended drawings and discussed in the detailed description can include not only the constituent elements that are essential to solving the problem, but also constituent elements that are not essential to solving the problem. Accordingly, it should not be immediately concluded that constituent elements which are not essential are in fact essential just because they are shown in the appended drawings and discussed in the detailed description.

Also, the above embodiments were given to illustrate examples of the technology disclosed herein, so various modifications, substitutions, additions, omissions, and so forth can be made within the scope of the patent claims or equivalents thereof.

INDUSTRIAL APPLICABILITY

The optical information recording medium and method for manufacturing the same disclosed herein have the effect of obtaining good signal quality without needing initialization, and this medium is useful for storing data that can be digitized, such as video, music, and information.

REFERENCE SIGNS LIST 1 substrate
2 reflective film
3 buffering film
4 recording film
5 protective film
6 laser light
7 object lens
401 first recording film component
402 second recording film component
403 intermediate recording film component
411 first recording film component
412 second recording film component
413 intermediate recording film component
421 first recording film component
422 second recording film component
423 intermediate recording film component

The invention claimed is:
1. An optical information recording medium,
comprising a recording film on which information is recorded by irradiation with a light beam,
wherein the recording film contains germanium, bismuth, and at least 50 at % tellurium, and has:
a first recording film component formed in the planar direction and having a bismuth content of at least 15 at %;
a second recording film component formed in the planar direction on the side irradiated with the light beam, and having a bismuth content that is at least 10 at % lower than that of the first recording film component; and
one or more intermediate recording film components provided between the first recording film component and the second recording film component in order to mod- erate the change in the bismuth content in the film thickness direction between the first recording film component and the second recording film component, and having a bismuth content that is greater than the bismuth content of the second recording film component and is less than the bismuth content of the first recording film component.

2. The optical information recording medium according to claim 1, wherein the bismuth content of the recording film changes in stages in the film thickness direction.

3. The optical information recording medium according to claim 1, wherein the intermediate recording film component has a bismuth content that continuously decreases from the first recording film component side toward the second recording film component side.

4. The optical information recording medium according to claim 1, comprising:
    a substrate;
    a reflective film disposed between the substrate and the recording film;
    a buffering film disposed between the reflective film and the recording film; and
    a protective film disposed on the opposite side from the side of the buffering film where the substrate is disposed, wherein the side of the reflective film irradiated with the light beam is the buffering film side.

5. The optical information recording medium according to claim 4, wherein the substrate has a groove with a pitch of 0.5 µm or less provided on its surface as a tracking guide for the light beam that is used to record and reproduce information.

6. A method for manufacturing the optical information recording medium according to claim 2,
    comprising a recording film production step of producing the recording film by sputtering recording film targets having three or more different types of composition, in which the maximum and minimum bismuth contents differ by at least 10 at %, with one or more cathodes each,
    wherein, in the recording film production step, the object on whose surface the recording film will be produced is fixed opposite and over each recording film target, and successive laminations are performed.

7. A method for manufacturing the optical information recording medium according to claim 3,
    comprising a recording film production step of producing the recording film by sputtering recording film targets having two or more different types of composition, in which the bismuth contents differ by at least 10 at %, with one or more cathodes each,
    wherein, in the recording film production step, the object on whose surface the recording film will be produced is successively passed over the targets having two or more different compositions so as to change the composition in the film thickness direction.

8. A method for manufacturing the optical information recording medium according to claim 3,
    comprising a recording film production step of producing the recording film by sputtering one joined target obtained by joining recording film targets having two or more different types of composition, in which the bismuth contents differ by at least 10 at %, with one cathode,
    wherein, in the recording film production step, the object on whose surface the recording film will be produced is successively passed over the target having two or more different compositions so as to vary the composition in the film thickness direction.

* * * * *